(12) United States Patent
Buckelew et al.

(10) Patent No.: US 8,260,644 B2
(45) Date of Patent: Sep. 4, 2012

(54) AUTOMATED ROTATION TOOL

(75) Inventors: Alan B. Buckelew, Los Angeles, CA (US); Dean Brown, San Marino, CA (US); Mona Halprin Ehrenreich, Los Angeles, CA (US); Johannes Staudhammer Laue, Sunland, CA (US); Eric F. Alvarez, Pine Mountain Club, CA (US); Nathan Y. Chan, San Jose, CA (US)

(73) Assignee: Princess Cruise Lines, Ltd., Santa Clarita, CA (US)

( * ) Notice: Subject to any disclaimer, the term of this patent is extended or adjusted under 35 U.S.C. 154(b) by 461 days.

(21) Appl. No.: 12/427,361

(22) Filed: Apr. 21, 2009

(65) Prior Publication Data
US 2010/0268569 A1 Oct. 21, 2010

(51) Int. Cl.
*G06Q 40/00* (2012.01)
(52) U.S. Cl. ...................... 705/7.11; 705/7.42
(58) Field of Classification Search ............... 705/7.042
See application file for complete search history.

(56) References Cited

U.S. PATENT DOCUMENTS

| | | | | | |
|---|---|---|---|---|---|
| 5,111,391 A | * | 5/1992 | Fields et al. | ................ | 705/7.14 |
| 5,696,702 A | * | 12/1997 | Skinner et al. | ................ | 702/186 |
| 5,913,201 A | * | 6/1999 | Kocur | .......................... | 705/7.17 |
| 6,049,776 A | * | 4/2000 | Donnelly et al. | ............ | 705/7.14 |
| 6,970,829 B1 | * | 11/2005 | Leamon | ....................... | 705/7.14 |
| 7,155,399 B2 | * | 12/2006 | Andre et al. | ................... | 705/7.14 |
| 7,672,746 B1 | * | 3/2010 | Hamilton et al. | ............ | 700/100 |
| 2002/0040313 A1 | * | 4/2002 | Hunter et al. | .................... | 705/9 |
| 2003/0191678 A1 | * | 10/2003 | Shetty et al. | ..................... | 705/8 |
| 2004/0267591 A1 | * | 12/2004 | Hedlund et al. | .................. | 705/9 |
| 2008/0183547 A1 | * | 7/2008 | Halaby | ............................. | 705/9 |
| 2008/0281666 A1 | * | 11/2008 | Kessman et al. | ................. | 705/9 |
| 2008/0300953 A1 | * | 12/2008 | Sarlay | .............................. | 705/9 |
| 2009/0043635 A1 | * | 2/2009 | Mori | ................................ | 705/9 |

* cited by examiner

*Primary Examiner* — Thomas Dixon
*Assistant Examiner* — Benjamin S Fields
(74) *Attorney, Agent, or Firm* — Stephen C. Glazier; K&L Gates LLP

(57) ABSTRACT

Various embodiments provide a scheduling system structured for generating at least one posting to fill a vacant post on a schedule. In an embodiment, the scheduling system includes a scheduling database and an automated rotation tool. The scheduling database includes a personnel roster and a schedule. The schedule includes a vacant post. The scheduling database transmits the schedule and the personnel roster to the automated rotation tool. The automated rotation tool includes a computer system, and receives the personnel roster and the vacant post beginning within the vacancy window from the scheduling database, and also receives a rule, a parameter, and a vacancy window. The automated rotation tool generates a posting assigning a person from the personnel roster to the vacant post according to the rule and the parameter, and transmits the posting to the scheduling database.

24 Claims, 22 Drawing Sheets

Personnel Roster

| Name | Rank | Availability | Home Location | Present Location |
|---|---|---|---|---|
| Smith | Waiter | 10/08-12/08 | Los Angeles | Cruise Ship A |
| Jones | Waiter/Bartender | 9/08-11/08 | San Francisco | San Francisco |
| Cooper | Bartender | 9/08 | Miami | Cruise Ship B |
| Miles | Bartender | 11/08-12/08 | New Orleans | Cruise Ship A |
| Baker | Waiter | 9/08, 11/08-12/08 | Vancouver | Vancouver |
| Johnson | Waiter | 9/08, 12/08 | Charleston | Belize City |
| Samuels | Waiter | None | Seattle | Cruise Ship C |
| Williams | Waiter/Bartender | 10/08 | Los Angeles | Los Angeles |
| Brown | Waiter | 9/08-12/08 | Miami | Miami |
| Davis | Bartender | 10/08, 12/08 | New York | Cruise Ship B |
| Miller | Waiter | 9/08-11/08 | San Diego | Melbourne |
| Webb | Bartender | 9/08 | Washington DC | Washington DC |

Posting 1

| Cruise Ship A – Bar 1 |
|---|
| Waiter 1 |
| October |
| Williams |

Posting 2

| Cruise Ship A – Bar 1 |
|---|
| Waiter 2 |
| September |
| Brown |

Posting 3

| Cruise Ship A – Bar 1 |
|---|
| Waiter 4 |
| September-November |
| Miller |

Posting 4

| Cruise Ship A – Bar 1 |
|---|
| Barender 2 |
| September |
| Webb |

Figure 7

| Schedule | Cruise Ship A – Bar 1 | | | |
|---|---|---|---|---|
| | September | October | November | December |
| Waiter 1 | Smith | Williams | Baker | |
| Waiter 2 | Brown | Johnson | | |
| Waiter 3 | | Samuels | | |
| Waiter 4 | Mies | Miller | | Jones |
| Bartender 1 | Webb | Cooper | | |
| Bartender 2 | | | | |

Personnel Roster

| Name | Rank | Availability | Home Location | Present Location |
|---|---|---|---|---|
| Smith | Waiter | 10/08-12/08 | Los Angeles | Cruise Ship A |
| Jones | Waiter/Bartender | 9/08-11/08 | San Francisco | San Francisco |
| Cooper | Bartender | 9/08 | Miami | Cruise Ship B |
| Miles | Bartender | 11/08-12/08 | New Orleans | Cruise Ship A |
| Baker | Waiter | 9/08, 11/08-12/08 | Vancouver | Vancouver |
| Johnson | Waiter | 9/08, 12/08 | Charleston | Belize City |
| Samuels | Waiter | None | Seattle | Cruise Ship C |
| Williams | Waiter/Bartender | None | Los Angeles | Los Angeles |
| Brown | Waiter | 10/08-12/08 | Miami | Miami |
| Davis | Bartender | 10/08, 12/08 | New York | Cruise Ship B |
| Miller | Waiter | None | San Diego | Melbourne |
| Webb | Bartender | None | Washington DC | Washington DC |

| Rule | Description |
|---|---|
| Gender-Rep | Males should be replaced by males and females by females. Exception: Within a given crew change cycle (i.e., a crew change on a given ship on a given day), males may replace females or vice versa in pairs of 2 within a given rank. The exception can not be applied to ranks associated to the Female-Only rule or the Male-Only rule. |
| Female-Only | Rotate only females into this post. |
| Male-Only | Rotate only males into this post. |

Note: Gender proportions will tend to remain stable due to the Gender-Rep rule, therefore:
(1) The auto-rotations engine should always observe the Gender-Rep rule, as indicated for relevant ranks;
(2) After-the-fact reporting on gender proportions, by rank, by ship, and across all ships for a rank can provide monitoring tools for Fleet Personnel.

| Rule | %Male | %Female | Check |
|---|---|---|---|
| MF-0-100 | 0 | 100 | 100 |
| MF-05-95 | 5 | 95 | 100 |
| MF-10-90 | 10 | 90 | 100 |
| MF-15-85 | 15 | 85 | 100 |
| MF-20-80 | 20 | 80 | 100 |
| MF-25-75 | 25 | 75 | 100 |
| MF-30-70 | 30 | 70 | 100 |
| MF-35-65 | 35 | 65 | 100 |
| MF-40-60 | 40 | 60 | 100 |
| MF-45-55 | 45 | 55 | 100 |
| MF-50-50 | 50 | 50 | 100 |
| MF-55-45 | 55 | 45 | 100 |
| MF-60-40 | 60 | 40 | 100 |
| MF-65-35 | 65 | 35 | 100 |
| MF-70-30 | 70 | 30 | 100 |
| MF-75-25 | 75 | 25 | 100 |
| MF-80-20 | 80 | 20 | 100 |
| MF-85-15 | 85 | 15 | 100 |
| MF-90-10 | 90 | 10 | 100 |
| MF-95-05 | 95 | 5 | 100 |
| MF-100-0 | 100 | 0 | 100 |

Figure 10a

| Rule | Description |
|---|---|
| Vessel-Class-1 | Must have experience on vessel class in 12 months prior to the appointment |
| Vessel-Class-2 | Must have experience on vessel class in 24 months prior to the appointment |
| Ship-1 | Must have experience on ship in 12 months prior to the appointment |
| Ship-2 | Must have experience on ship in 24 months prior to the appointment |
| Vessel-Return-Promotion | Newly promoted crew member must return to vessel of previous posting. |
| Destination-1 | Must have experience on destinations of proposed posting during 12 months prior to the appointment (rule needs more work. Ship has many destinations). |
| Destination-2 | Must have experience on destinations of proposed posting during 24 months prior to the appointment (rule needs more work. Ship has many destinations) |
| Proportional-Spread-NH | The ratio of individuals working on their first contract (first contract period or first contract under a particular rank) on each ship should be similar from ship to ship. |
| Percent-First-Contract-20-4 | When all crew members of this rank on a particular ship are analyzed together, no more than 20% of them can be on their first contract serving as this rank. A crew member is no longer considered to be on the first contract once the first 4 months of the contract have elapsed. |
| Percent-First-Contract-25-5 | When all crew members of this rank on a particular ship are analyzed together, no more than 25% of them can be on their first contract serving as this rank. A crew member is no longer considered to be on the first contract once the first 5 months of the contract have elapsed. |

Figure 10b

| Rule | Description |
|---|---|
| 2-Contract | After 2 successive appoints to the same ship, crew member should be rotated to a different ship (*). |
| 3-Contract | After 3 successive appoints to the same ship, crew member should be rotated to a different ship (*). |
| 4-Contract | After 4 successive appoints to the same ship, crew member should be rotated to a different ship (*). |
| Dining-Type | Appoint only to ships of dining type (Any-Time, Traditional) indicated for this employee. |
|  | *All previous rotations should be considered, such that a natural rotation of each employee across all ships should result over time. |

Figure 10c

| Category | Rule | Description |
|---|---|---|
| Ship Selection | Appoint to Specific Brand | Only appoint crew member's to the Brand(s) to which they are associated. |
| Cost Savings | Lowest Cost Joiner | When choosing crew from amongst a set of candidates that all pass successfully (equally) through required rule, choose the crew member that requires travel between home airport and joining airport having the minimum cost. |
| Cost Savings | Lowest Cost Leaver | Posting length is generally set by adding the crew member's contract length to the joining day, and then backing the calculated end date up to the next available port (i.e., a port that allows crew turn-around and is acceptable for turn-around for crew of the specified rank per Turn Around Rules). From the calculated disembarkation port, check prior 2 and next 2 ports for cheapest air and expand/shrink the posting, as necessary, to achieve the lowest cost air fare to return the crew member to home. |
| Experience | Minimum-Score | There are two components to this rule:<br>(1) Overall score of 2 or 1 precludes subsequent appointment until a review is performed and an override is marked to allow further appointments. In other words, the crew member is either eligible to be rotated or not eligible to be rotated based on the most recent performance evaluation.<br>(2) Within a set of candidates for whom all other factors are equal, rotate the crew member with the highest overall score on their most recent appraisal before rotating the others. |
| Ship Selection | Specific Ships | Crew member's next appointment must be to one of a specific set of ships, *if such is explicitly specified for this employee*. If specified set of ships is a list containing just one ship, appoint only to that ship. |
| Ship Selection | Specific Class | Crew member's next appointment must be to a ship belonging to a specified class, *if such is explicitly specified for this employee*. (Note: This rule can be used to send certain individuals, e.g., waiters, to traditional dining ships only.) |
| Utilization | Prevent Underutilization | When choosing crew from amongst a set of candidates that all pass successfully (equally) through required rule, choose the crew member that has (or will have) the greatest number of days since previous posting. |

Figure 10d

| | | |
|---|---|---|
| Crew Change Limits | Max Percent Crew Change | As specified for each rank, a limit is to be imposed on the number of crew that are allowed to disembark on any given day. The limit is stated as a percentage of the total number of crew on the ship serving in posts of the given rank. If there are 100 Junior Waiter posts and the max percent crew change for Junior Waiters is 20%, then only 20 Junior Waiters may be scheduled to disembark on any given day. |
| Vacation Reduction | Max Percent Vacation Reduction | As specified for each rank, a limit is defined which allows a percentage of a crew member's vacation period to be eliminated to allow for greater flexibility in selecting that crew member for a posting. On a sliding scale, the greater the number of vacation days used, the greater the "penalty" that should be imposed for doing so. |
| Ship Selection | Dis-Companion | Crew member A may not be rotated on to a ship if his or her dis-companion, crew member B, is scheduled to serve aboard the same ship at any time during the life of the proposed posting of crew member A. |
| Competences | | Note: These requirements are covered within MAPS. Any posting on the database related to a crew member missing a job competence, passport, visa or medical certificate will be flagged as a "Non-Conformance" and the Business will manage this separate and apart from the automated postings process. |
| Passports | | |
| Visas | | |
| Medical Certificates | | |

Figure 10e

|  |  | Captain | Staff Capt. | Officer on Watch | Sec. Officer | ENVO |
|---|---|---|---|---|---|---|
| EXPERIENCED IN RANK | RETURNING TO SAME SHIP WITHIN 6 MONTHS | Same Day | Same Day | Same Day | Same Day | Same Day |
|  | RETURNING TO SAME SHIP BETWEEN 6 TO 24 MONTHS | 3 Days | 3 Days | 3 Days | 3 Days | 1 Day |
|  | SAILED ON SHIP CLASS NOT ON SHIP | 3 Days | 3 Days | 3 Days | 3 Days | 1 Day |
|  | NOT SAILED ON SHIP CLASS IN LAST 24 MONTHS | 5 Days | 5 Days | 5 Days | 5 Days | 3 Days |
|  | NOT SAILED ON SHIP CLASS | 7 Days | 7 Days | 7 Days | 7 Days | 3 Days |
| FIRST TRIP IN RANK | SAILED ON SHIP CLASS | 7 Days | 7 Days | 5 Days | NA | 7 Days |
|  | NOT SAILED ON SHIP CLASS | 14 Days | 14 Days | 14 Days | NA | 7 Days |
|  | NEW TO COMPANY | N/A | 28 Days | 28 Days | 28 Days | 14 Days |

| | PROMOTION_RETURN_SHIP ▽ | CONTACT_RETURN_MAX ▽ | EXPERIENCE_CLASS_MLL |
|---|---|---|---|
| | Y | 3 | 36 |
| | Y | 3 | 36 |
| | Y | 3 | 36 |
| | Y | 3 | 36 |
| | Y | 3 | 36 |
| | Y | 3 | 36 |
| | Y | 3 | 36 |

FIG. 11C

| JOB DIARY | | |
|---|---|---|
| ◇ COMPETENCY MGMT | ▽ ALL ORGANISATION STRUCTURE | |
| 🖩 PAYROLL | UNIT | |
| 🗐 RECRUITMENT | ⊞☐ ACCOM_AP | |
| 🎀 REFERENCE DATA | | |
| ↝ ROTATIONS | | |
| ROTATIONS | | |
| ⊛ EXPORT NEXT RELIEFS | ◁‖ | |
| ▫ VACANT JOBS BY SHIP | ▽ NEW FILTER TEMPLATE FOR JOBS ON SELECTED UNIT | |
| ▫ JOB DIARY | MAPS | 2008 |
| ⊛ SHIP'S MINERARY DIARY | DIARY VIEW | NOVEMBER ‖ DECEMBER |
| ▤ JOB DIARY BY SELECTED RANK | | ◁ 017921 MR MIRANDA, (M)(PHL): STATEROOM |
| ▦ PERSON DIARY BY SELECTED RANK | ▫ STATEROOM STEWARD 56 IN ACCOM_AP | |
| | | ◁ 004408 MR TRIMPEA, (M)(ROM): STATEROOM |
| ▱ VACANT JOBS BY SELECTED RANK | ▫ STATEROOM STEWARD 57 IN ACCOM_AP | |
| ⊠ PORT CALLS BY SHIP | ▫ STATEROOM STEWARD 58 IN ACCOM_AP | ◁ 017738 MS GUINTO, (F)(PHL): STATEROOM |
| ⌘ NEXT RELIEF | ▫ STATEROOM STEWARD 59 IN ACCOM_AP | ◁ 006479 MR CARDOZ, (M)(IND): STATEROOM |
| ▱ AVAILABLE PEOPLE BY SELECTED RANK | ▫ STATEROOM STEWARD 60 IN ACCOM_AP | ◁ 020640 MR TORRALBA, (M)(PHL): STATEROOM |
| | ▫ STATEROOM STEWARD 61 IN ACCOM_AP | ◁ 016539 MR ARRIOLA, (M)(PHL): STATEROOM |
| ▨ ALL POSTINGS FOR SELECTED PEOPLE | ▫ STATEROOM STEWARD 62 IN ACCOM_AP | ◁ 023726 MR JAIMUN, (M)(THA): STATEROOM |
| | ▫ STATEROOM STEWARD 63 IN ACCOM_AP | ◁ 019415 MR GARCIA, (M)(PHL): STATEROOM |
| ▨ ALL POSTINGS FOR JOBS OF SELECTED RANK | | ◁ 021502 MS DE GUZMAN, (F) (F |
| ▨ POSTINGS BY STATUS | ▫ STATEROOM STEWARD 64 IN ACCOM_AP | 016300 MS VIRAY, |
| ▨ POSTINGS SEARCH | | ◁ 016838 MR ALFONSO, (M) (PHL) |
| ▨ POSTINGS SEARCH BY DATE  ▽ | ▫ STATEROOM STEWARD 65 IN ACCOM_AP | 309604 MR NIERRAS, |
| ⚠ ROTATION EXCEPTION | ▫ STATEROOM STEWARD 66 IN ACCOM_AP | ◁ 016744 MR COLLAMOR, (M)(PHL): STATEROOM |
| ▷ SHIP INFO | ▫ STATEROOM STEWARD 67 IN ACCOM_AP | ◁ 016296 MR MARTIN, (M)(PHL): STATEROOM |
| 🏢 SHORE MANNING | | ◁ 023655 MR PHUSUA, (M)(THA): STATEROOM |
| 🚢 SHIP MANNING | ▫ STATEROOM STEWARD 68 IN ACCOM_AP | |
| 🎓 TRAINING | | ◁ ☐ |
| ✈ TRAVEL | ▫ STATEROOM STEWARD 69 IN ACCOM_AP | |
| ▨ MAPS ADMIN | | 024513 MS DEEJUN, P (F)(THA): STATEROOM |
| ▨ OTHER | ▫ STATEROOM STEWARD 70 IN ACCOM_AP | ◁ 018351 MR GUNTANG, (M)(PHL): STATEROOM |
| ◇ TO DO | | |

*FIG.13A*

|  | | 2009 | | | | VIEW DATE 11/11/2008 |
|---|---|---|---|---|---|---|
|  | JANUARY | FEBRUARY | MARCH | APRIL | MAY | 1 + RECORD |

STEWARD 56 IN ACCOM_AP 05 A
506847 MR FLOREA,M (M)(ROM): STATEROOM STEWARD 56 IN ACCOM_AP 30 JAN - 11 JUL
STEWARD 57 IN AC
308406 MR VOICU, N A (M)(ROM): STATEROOM STEWARD 57 IN ACCOM_AP 16 JAN - 27 JUN
STEWARD 58 IN ACCOM_AP 14 MAY - 13 MAR
STEWARD 59 IN ACCOM_AP 18 AUG - 25 APR
STEWARD 60 IN ACCOM_AP 11 SEP - 27 JUN
STEWARD 61 IN ACCOM_AP 25 JUL - 14 MAY
STEWARD 62 IN ACCOM_AP 19 JUN - 27 MAR
STEWARD 63 IN ACCOM_AP 25 JUL - 09 MAY

MC (F)(PHL): STATEROOM STEWARD 64 IN ACCOM_AP 13 DEC - 01 OCT (M)(PHL): STATEROOM STEWARD 65 IN ACCOM_AP 13 DEC - 29 SEPT
STEWARD 66 IN ACCOM_AP 30 AUG - 18 JUN
STEWARD 67 IN ACCOM_AP 19 JUN - 27 MAR
STEWARD 68 IN ACCOM_AP 12 A
003997 MR CHELMUS, (M)(ROM): STATEROOM STEWARD 68 IN ACCOM_AP 30 JAN - 11 JUL
STEWARD 69 IN ACCOM_AP 10 NOV - 01 AUG
STEWARD 70 IN ACCOM_AP 30 AUG - 18 JUN

AUTOMATED ROTATION TOOL

BACKGROUND

Some enterprises need to fill positions at both stationary and non-stationary work locations with large numbers of workers who may be spread across a wide geographic area. Workers may be rotated in and out of these positions, requiring scheduling that ensures that a position does not go vacant for an unacceptable period of time. As the size of the enterprise increases, the job of scheduling workers to fill positions within the enterprise becomes increasingly complex.

For example, a cruise ship operator may have a large number of non-stationary locations, such as cruise ships. The cruise ship operator may have thousands of positions, or posts, to fill on the cruise ships. Consequently, the cruise ship operator may employ thousands of workers, both employees and independent contractors, as crew on the cruise ships. Each post may need to be filled by a crew member appropriate for that post, for example, having the appropriate skills, certificates, and license, and the scheduling of crew members may need to take into account how long one crew member can fill a post and how the crew member will get to the location of the post and back home. The cruise ship operator may need to perform complex scheduling to get the right crew members to the right locations to fill the right post at the right time while keeping travel costs down and vacancy times to a minimum. The scheduling can be done manually, making use of current database software, but this may be tedious, labor-intensive, time-consuming, and the schedule produced may not be the most efficient or optimal schedule.

BRIEF DESCRIPTION OF THE FIGURES

The utility of the embodiments of the invention will be readily appreciated and understood from consideration of the following description of the embodiments of the invention when viewed in connection with the accompanying drawings.

FIG. 6 depicts an exemplary section of a personnel roster;

FIG. 7 depicts exemplary postings generated by the automated rotation tool;

FIG. 8 depicts an exemplary section of a schedule updated with exemplary postings;

FIG. 9 depicts an exemplary section of a personnel roster updated with exemplary postings;

FIGS. 10a-10f depict exemplary rules and parameters for use with an automated rotation tool;

FIGS. 11a and 11b depict exemplary screenshots of a user inputting rules and parameters into an automated rotation tool;

FIG. 13 depicts an exemplary screenshot of a schedule with vacant posts;

FIG. 14 depicts an exemplary screenshot of data for a person from a personnel roster; and FIGS. 15a and 15b depict exemplary screenshots of a posting.

DESCRIPTION

Various embodiments provide scheduling systems and methods that can be configured and executed to perform scheduling operations. An automated rotation tool may receive data from a scheduling database, including vacant posts and a personnel roster containing persons who may be used to fill the vacant posts. The automated rotation tool may generate postings by selecting persons to fill the vacant posts. Rules and parameters input into the automated rotation tool may be used to govern the way the selection is performed, for example, placing restrictions on which persons can be used to fill certain vacant posts, and/or optimizing the selection based on factors such as travel time or travel cost. The postings generated by the automated rotation tool may be sent to the scheduling database, updating the schedule and triggering peripheral actions, such as the notification of scheduled persons and the booking of travel arrangements for scheduled persons. Optionally, the postings generated by the automated rotation tool may be reviewed by a user before they are used to update the schedule, for example, by displaying the schedule updated with the postings to allow the user to view the effect the posting will have on the schedule if approved. If the user approves of the postings, then they may be used by the scheduling database to update the schedule.

Figure 1:
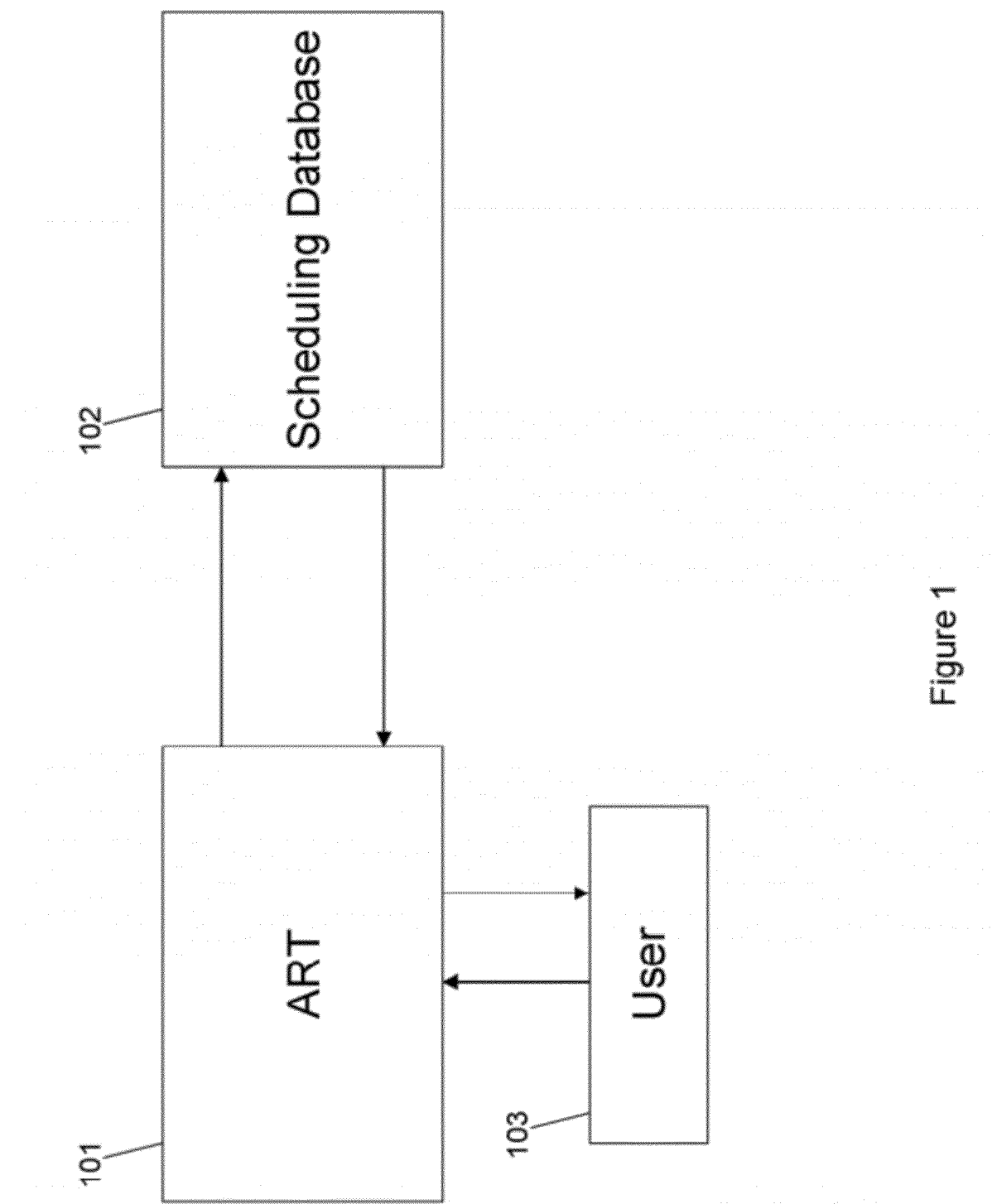
FIG. 1 depicts an exemplary system including an automated rotation tool.
Figure 2:
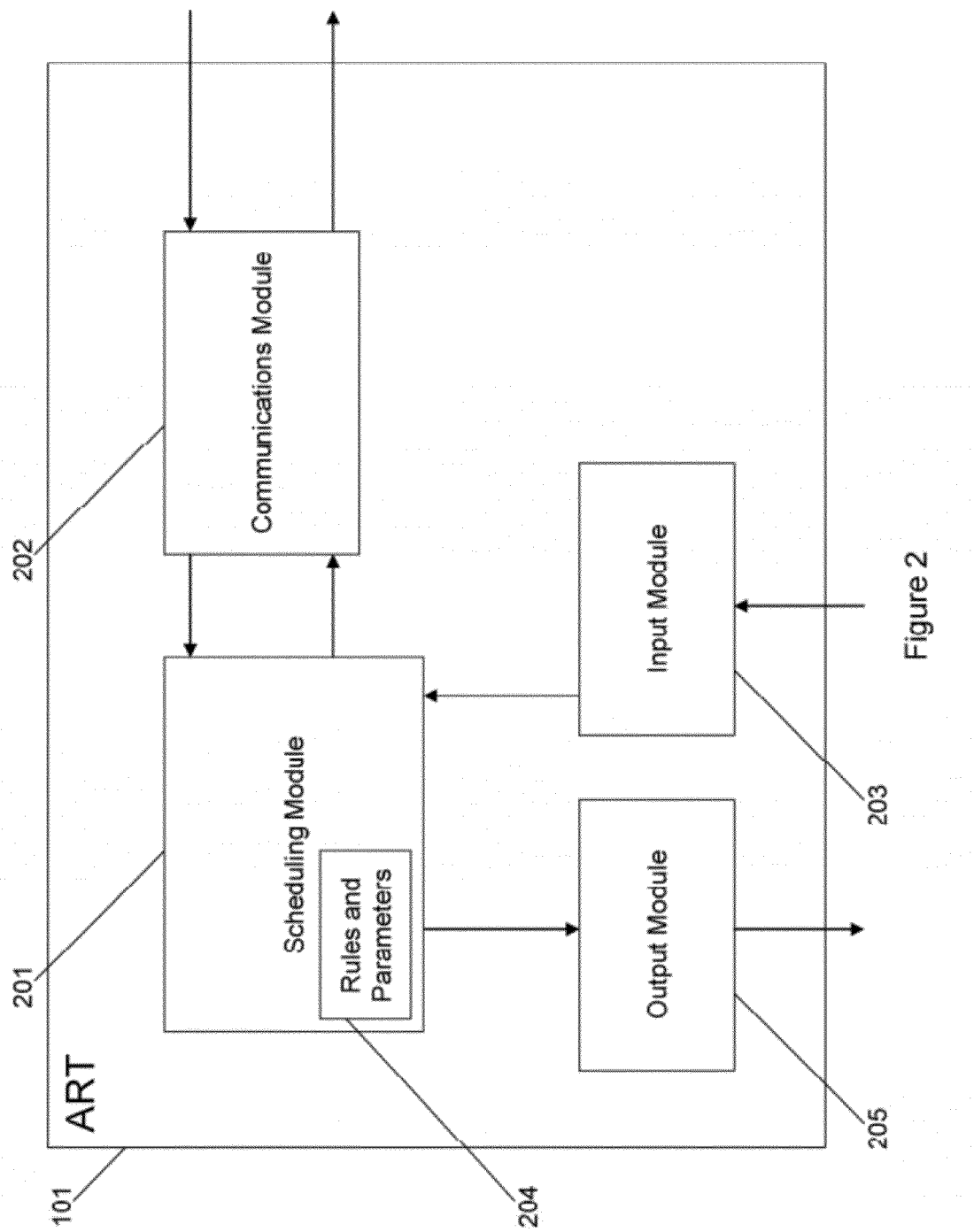
FIG. 2 depicts an exemplary block diagram of an automated rotation tool.
Figure 3:
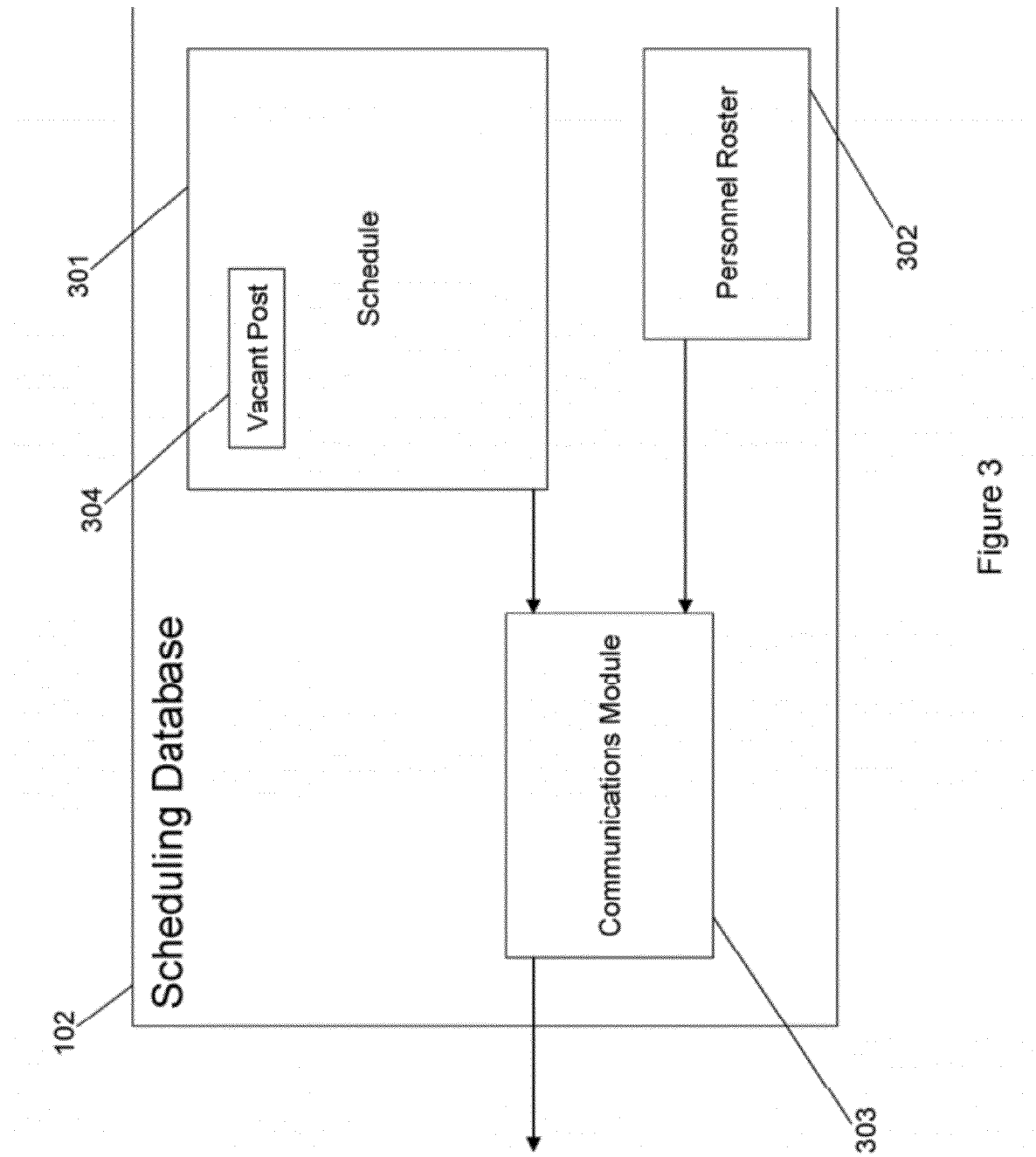
FIG. 3 depicts an exemplary block diagram of a scheduling database for use in a system with an automated rotation tool.

FIGS. 1 through 3 depict the interaction between an exemplary automated rotation tool (ART) 101 and an exemplary scheduling database 102 in a scheduling system. The ART 101 may be implemented on any suitable computer system, and may include a scheduling module 201, communications module 202, input module 203, and output module 205. For example, in an exemplary embodiment, the ART 101 may be implemented using software written in Microsoft Visual Basic running on Windows NT Server which may be running on any suitable server hardware, either as the primary operating system or within a virtual machine.

The scheduling module 201 of the ART 101 may be any suitable combination of hardware and software for implementing a scheduling algorithm, such as, for example, a linear optimization based scheduling algorithm. For example, in an exemplary embodiment, the scheduling module 201 may be implemented using a linear optimization scheduling software package available and the GNU license. The scheduling module 201 may include rules and parameters 204. The rules and parameters 204 may govern the operation of the scheduling algorithm. FIGS. 10a through 10f depict exemplary rules and parameters 204 for use with the ART 101.

Figures 11A, 11B:
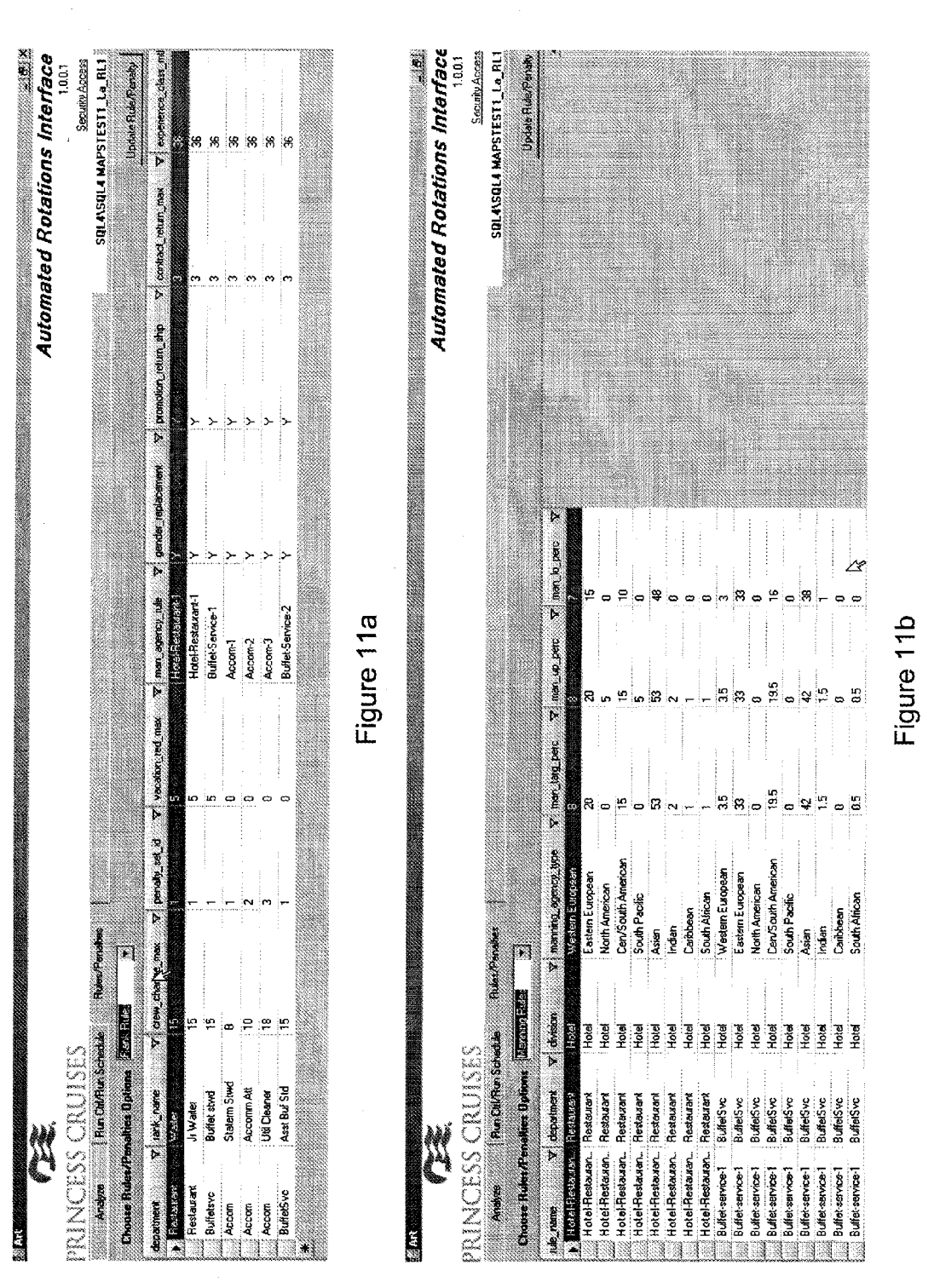

The rules and parameters 204 may be input into the ART 101 by a user 103. FIGS. 11a and 11b depict exemplary screenshots of the user 103 inputting the rules and parameters 204 into the ART 101. The rules and parameters 204 may encompass any guidelines to be used by the scheduling module 201 in generating postings, and may be adjusted based on the enterprise using the ART 101. For example, for a cruise line, the rules and parameters 204 may include: rank rules, which may vary in application by rank and include recruiting office rules, berthing rules (gender balance must be maintained to ensure that a male and female do not end up sharing a berth on a ship), nationality and language balance rules (different cruise ships may require certain numbers of crew members who speak various language or are of various nationalities), experience rules, and ship selection rules; universal rules, which may apply to all persons, regardless of rank, and include cost savings rules (minimizing the cost to get a person to a post or back home from a post), utilization rules, experience rules, ship selection rules, and crew change limits; start/end date adjustment rules, which may be applied to certain vacant posts 304 to adjust the exact dates the post starts and ends; vacancy window parameters; and minimum vacancy duration parameters.

The rules and parameters 204 may include a vacancy window. The vacancy window may define a period of time in which the vacant post 304 must become vacant for the ART 101 to fill the vacant post 304. If the vacant post 304 becomes vacant during the period of time defined by the vacancy window, the ART 101 may attempt to fill the vacant post 304. Otherwise, the ART 101 may leave the vacant post 304 vacant, for example, to be filled during a subsequent running of the ART 101 using a different vacancy window, or to be filled manually by a user. The use of the vacancy window may allow the user 103 to control how far the schedule created from the postings generated by the ART 101 extends into the future. For example, a vacancy window of 60 days from Sep. 20, 2008, will result in the ART 101 generating postings only for vacant posts 304 that become vacant between Sep. 20, 2008 and Nov. 18, 2008. In this case, the ART 101 will not generate a posting for a vacant post 304 that becomes vacant on Nov. 25, 2008.

The rules and parameters 204 may also include a minimum vacancy duration. A minimum vacancy duration may define the smallest period of time a vacant post 304 must be vacant for the ART 101 to fill the vacant post 304. If a vacant post 304 is vacant for at least the minimum vacancy duration the ART 101 may attempt to fill the vacant post 304. Otherwise, the ART 101 may leave the vacant post 304 vacant, for example, to be filled during a subsequent running of the ART 101 using a different minimum vacancy duration, or to be filled manually by a user. The use of a minimum vacancy duration may allow the user 103 to control the level of micromanagement performed by the ART 101. For example, a minimum vacancy duration of 7 days will result in the ART 101 generating postings only for vacant posts 304 that are vacant for at least 7 days. For example, if a vacant post 304 is a waiter post that is only vacant for 6 days, the ART 101 would not attempt to fill the vacant post 304. If the vacant post 304 is vacant 8 days, the ART 101 would attempt to fill the vacant post 304 by posting a person to the post for at least some of those 8 days.

The rules and parameters 204 may also include penalties. A penalty may be a monetary amount that is a maximum acceptable cost of breaking one of the rules and parameters 204 when filling the vacant posts 304, if breaking the one of the rules or parameter 204 will lead to a more optimal schedule. For example, the berthing rules may have a penalty of $1000. If, while filling the vacant posts 304, the ART 101 determines that breaking a berthing rule will cost only $500, the ART 101 may break the berthing rule if doing so will result in a more optimal schedule, as the cost is less than the penalty amount.

The communications module 202 of the ART 101 may be any suitable combination of hardware and software for sending and receiving data, for example, to and from another computer system. The communications module 202 may be communicatively connected to the scheduling database 102, may receive data from the scheduling database 102 and pass the data to the scheduling module 201, and may transmit data, for example, postings, generated by the scheduling module 201 to the scheduling database 102.

The input module 203 of the ART 101 may be any suitable combination of hardware and software for receiving data input by, for example, a user of the system. For example, the input module 203 may receive data from a keyboard and mouse. Data received by the input module 203 may be used to create and/or modify the rules and parameters 204, and to otherwise control the operation of the ART 101. For example, the input module 203 may be used to instruct the ART 101 to perform scheduling operations, or to transmit the postings generated by the scheduling module 201 after performing scheduling operations to the scheduling database 102.

The output module 205 of the ART 101 may be any suitable combination of hardware and software for outputting data from the ART 101. For example, the output module 205 may output data to a computer monitor, and/or generate email or other types of electronic messages to be sent through the communications module 205 to another computer system, where the data may be viewed by a user.

The scheduling database 102 may be any suitable combination of hardware and software for implementing a database. A schedule 301 and personnel roster 302 may be stored in the scheduling database 102. The scheduling database 102 may also include a communications module 304. For example, in an exemplary embodiment, the scheduling database may be implemented using Microsoft SQL Server 2000 or 2005 software, running in Windows NT Server running on any suitable server hardware.

Figure 5:
FIG. 5 depicts an exemplary section of a schedule.

The schedule 301 may be all or a portion of a work or assignment schedule for people who work for or with an enterprise. FIG. 13 depicts an exemplary screenshot of a schedule with vacant posts. FIG. 5 depicts an exemplary embodiment of a section of the schedule 301, for Bar 1 on Cruise Ship A from September through December. Information in the schedule 301 may include the names of people, for example, employees or independent contractors, posted to positions, or posts, throughout the enterprise, the period of time for which that person is posted to a post, and the location of the post. For example, referring to FIG. 5, Johnson has been posted to a waiter post, Waiter 2 at Bar 1 on Cruise Ship A, for a period of two months, October and November. The schedule 301 may also include the vacant post 304. The vacant post 304 is a post to which no one has been posted. Referring to FIG. 5, no one is posted to Waiter 1, one of the waiter posts at Bar 1 on Cruise Ship A, for October and November. Waiter 1 for October and November is an exemplary vacant post 304. If a post is located at a non-stationary location, such as, for example, a cruise ship, the schedule 301 may also include the location of the non-stationary location at different points in time. For example, a cruise ship, and any posts on the cruise ship, may be located near Los Angeles in September, but near Anchorage in October.

Figure 14:
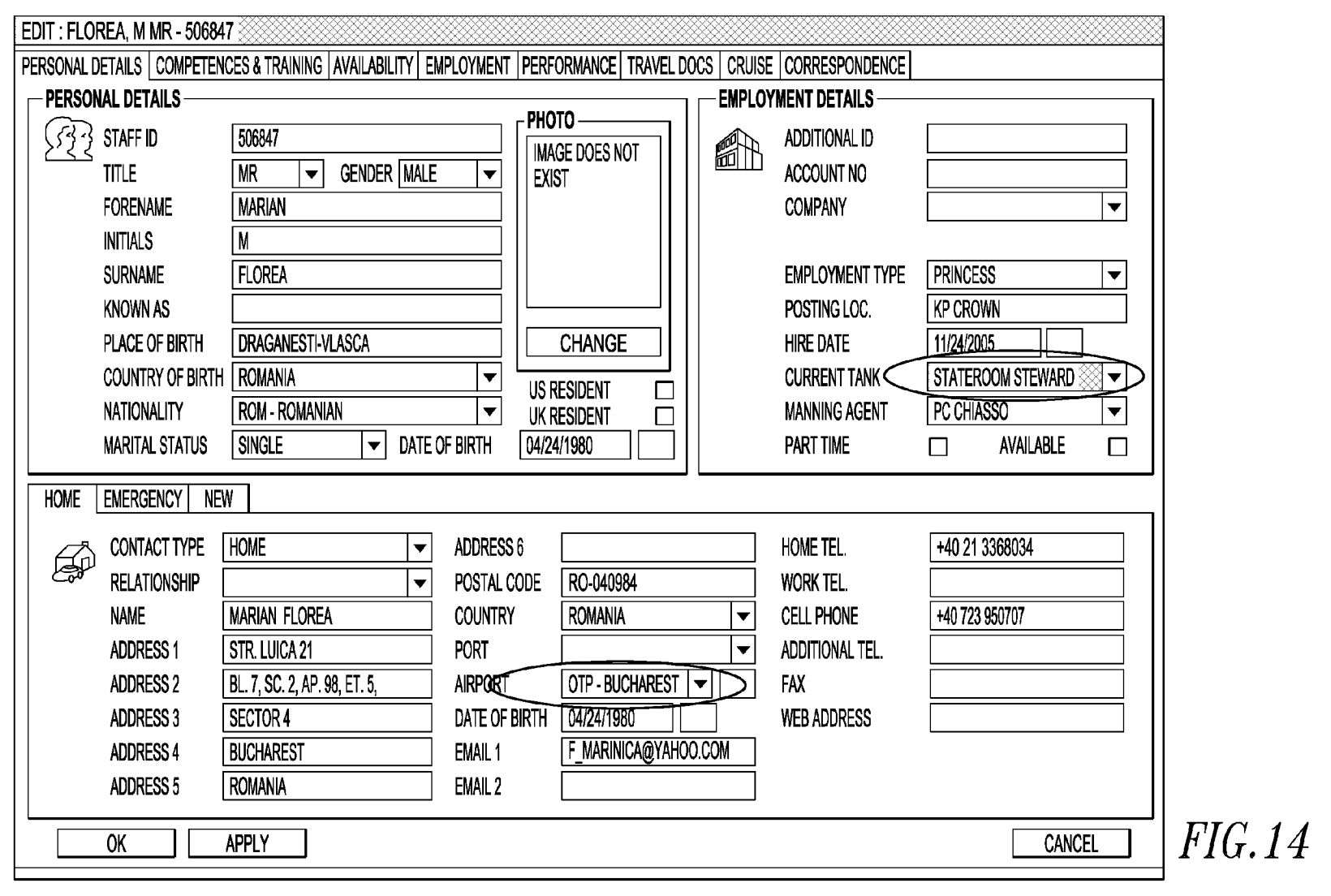

The personnel roster 302 may be all or a section of a list of people eligible to be assigned to posts by the enterprise. For example, the personnel roster 302 may include crew members who may be assigned to posts on a cruise ship by a cruise line. FIG. 6 depicts an exemplary embodiment of a section of the personnel roster 302. Information in the personnel roster 302 may include the names of people, for example, employees or independent contractors, eligible to be posted to jobs throughout the enterprise, for example, crew members eligible to be posted to cruise ships; their rank or position which may determine what types of jobs they are eligible to be posted to; their dates of availability; their home location; and their current location. For example, referring to FIG. 6, Johnson has the rank of waiter, is available for the months of September and December 2008, lives in Charleston, and is currently in Belize City. Other information that may be in the personnel roster 302 includes a person's pay rate, years of service, performance rankings, years of experience in particular posts, or any other information that may be useful in determining whether to assign a person to a post. FIG. 14 depicts an exemplary screenshot of data for a person from a personnel roster.

The communications module 303 of the scheduling database 102 may be any suitable combination of hardware and software for sending and receiving data, for example, to and from another computer system. The communications module 303 may be communicatively connected to the ART 101, may transmit data, for example, the schedule 301 and the personnel roster 302, to the ART 101, and may receive data, for example postings, from the ART 101.

The scheduling database 102 may also be used by a user to preview the postings generated by the ART 101 before they are used to make changes to the schedule 301. A preview version of the schedule 301 may be generated by the scheduling database 102, allowing the user to view the schedule 301 as the schedule 31 would look after being updated with the generated postings. The user may then approve or disapprove the generated postings, either individually or as a group. Any approved generated postings may be used to update the schedule 301.

Figure 4:
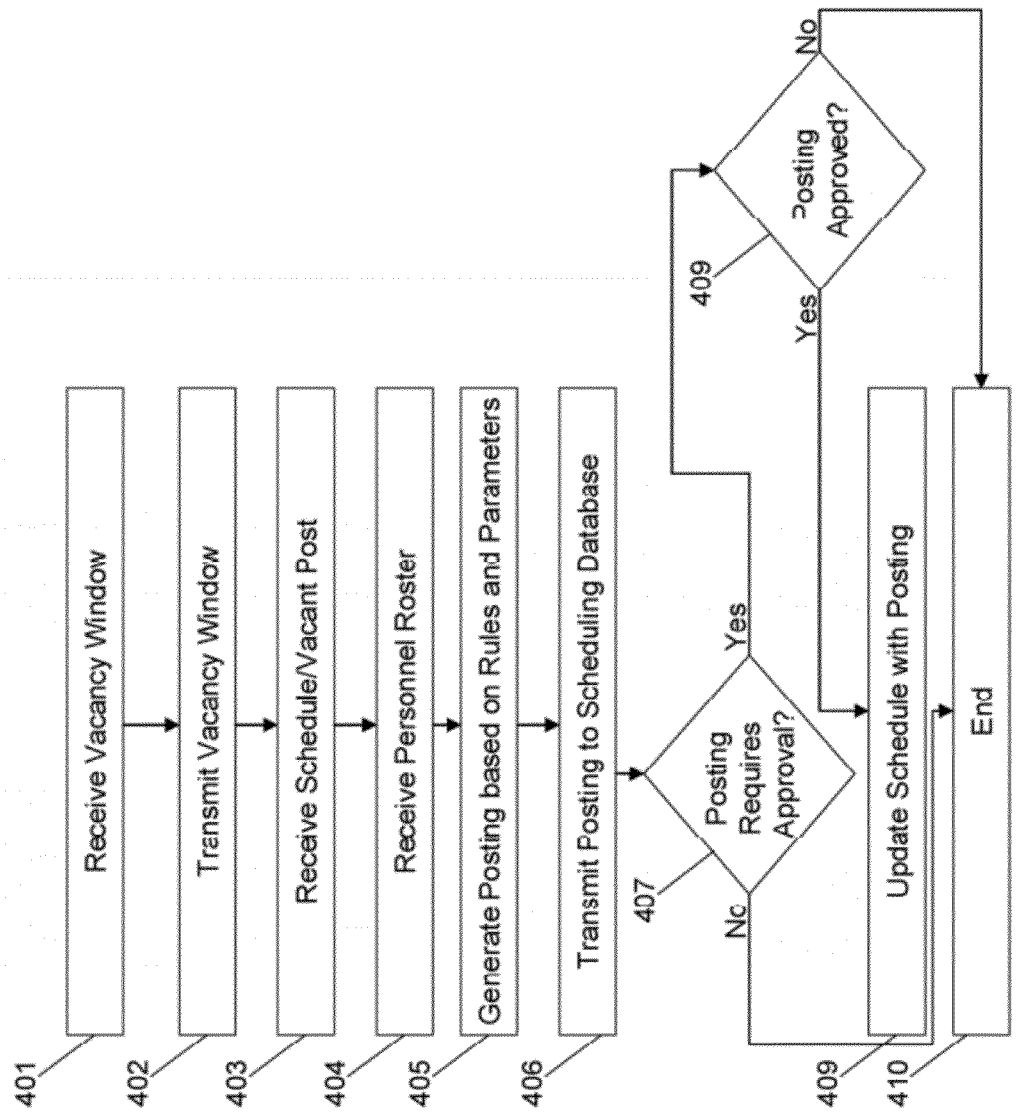
FIG. 4 depicts an exemplary flowchart for filling vacant posts using an automated rotation tool.

FIG. 4 depicts an exemplary flowchart for filling the vacant posts 304 using an automated rotation tool. In block 401, the ART 101 may receive a vacancy window. The vacancy window may be input into the ART 101 by the user 103, using the input module 203. The ART 101 may also receive the vacancy window through the use of preset settings within the ART 101, or from data automatically retrieved by the ART 101 from a file on the ART 101 computer system or another computer system.

Figures 12A, 12B:
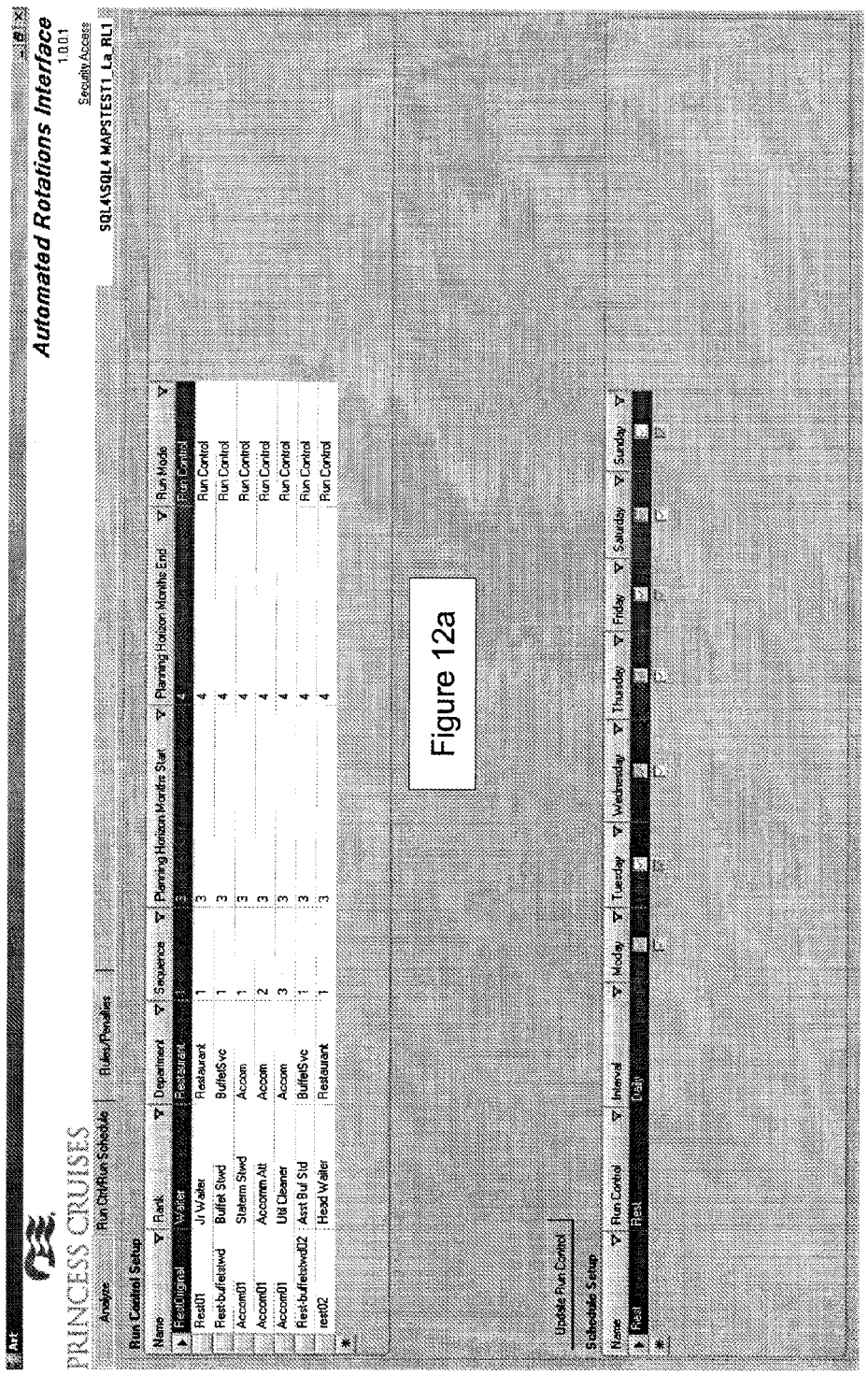
FIGS. 12a and 12b depicts exemplary screenshots of a user inputting a vacancy window into an automated rotation tool.

For example, the user 103 may use a keyboard to input a vacancy window of 60 days into input module 203 of the ART 101. FIGS. 12a and 12b depict exemplary screenshots of a user 103 inputting the vacancy window. The exemplary vacancy window in FIGS. 12a and 12b may be for a schedule for a cruise line, and may start the first day of the third month subsequent to the current system date and end the last day of the fourth month subsequent to the current system date. The ART may find all vacant posts 304 that become vacant within the 2 month period of the exemplary vacancy window and schedule a single crew member from the cruise line to serve, for example, one full contract period in each of the vacant posts 304, beginning on the first day of the vacant post 304. The full contract period for a cruise line may be, for example, 10 months.

In block 402, the ART 101 may transmit the vacancy window to the scheduling database 102. The communications module 202 of the ART 101 may transmit the vacancy window received in block 401 to the communications module 303 of the scheduling database 102. The scheduling database 102 may interpret the receipt of the vacancy window from the ART 101 as a request for any vacant post 304 that begins within the vacancy window and the personnel roster 302 of people who may be eligible to fill any such vacant post 304.

For example, the exemplary vacancy window of 60 days may be transmitted to the communications module 303 of the scheduling database 102. The scheduling database 102 may check the schedule 301 for any vacant posts 304 that begins within the 60 day vacancy window. Referring to the exemplary schedule 301 of FIG. 5, if the 60 vacancy window begins on Sep. 1, there would be four vacant posts 304 that begin within the vacancy window: Waiter 1, October; Waiter 2, September; Waiter 4, September-November; and Bartender 2, September.

In block 403, the ART 101 may receive any vacant posts 304 from the scheduling database 102. The ART 101 may also optionally receive the entirety of the schedule 301, including the vacant posts 304 and non-vacant posts. The communications module 202 of the ART 101 may receive any vacant posts 304 and optionally the schedule 301 from the communications module 303 of the scheduling database 102. The scheduling database 102 may determine which vacant posts 304 to transmit to the ART 101 based on the vacancy window. Vacant posts 304 that begin within the vacancy window may be transmitted to the ART 101. The entirety of the schedule 301, or a portion thereof, may also be transmitted to the ART 101, depending on the preference of the system designer. For example, if the schedule 301 is a very large database file, it may be inefficient to attempt to transmit the entire schedule 301 to the ART 101. The vacant posts 304 may be any vacancies on the schedule 301 beginning within the vacancy window, and may be for any posts at any locations throughout an enterprise.

For example, the four vacant posts 304 from the exemplary schedule 301 of FIG. 5 may be received by the communications module 202 of the ART 101. The communications module 202 may pass the four vacant posts 304 to the scheduling module 201.

In block 404, the ART 101 may receive the personnel roster 302 from the scheduling database 102. The communications module 202 of the ART 101 may receive the personnel roster 302 from the communications module 303 of the scheduling database 101. All or a portion of the personnel roster 302 may be received by the ART 101, depending on the preference of the system designer. For example, the ART 101 may receive only the portion of the personnel roster 302 that includes persons with ranks and/or dates of availability that would make them eligible for the vacant posts received by the ART 101 in block 403.

For example, the exemplary personnel roster 302 depicted in FIG. 6 may be received by the communications module 202 of the ART 101. The communications module 202 may pass the personnel roster 302 to the scheduling module 201.

In blocks 404 and 405 the ART 101 may receive additional data from the scheduling database 102, including a listing of currently filled posts from the schedule 301, a listing of the persons posted to the filled posts, the schedule of any non-stationary location with posts, such as, for example, cruise ships, and additional rules and parameters 204 that may be specific to the vacant posts 304 sent to the ART 101 in block 404. For example, the scheduling database 102 may include rank to rank alternatives for certain vacant posts, allowing persons of a rank other than the specific one called for by a post to be used in that post anyway, i.e., a bartender may be able to fill certain vacant posts meant for waiters.

In block 406, the ART 101 may generate postings to fill the vacant posts 304 received in block 403. The vacant posts 304 and the personnel roster 302 may be sent to the scheduling module 201 of the ART 101. The scheduling module 201 may generate postings, assigning a person from the personnel roster 302 to each of the vacant posts 304 that become vacant within the vacancy window, according to the rules and parameters 204. The ART 101 may fill all of the vacant posts 304, or may be instructed to fill only the vacant posts 304 for certain ranks, for example, the ART 101 may only fill the vacant posts 304 for the bartender rank. The scheduling module 201 may employ linear optimization algorithms modified to account for the rules and parameters 204. The scheduling module 201 may take such rules and parameters 204 into account when generating postings, so as to generate postings that optimally adhere to, and do not violate any of, the rules and parameters 204. The rules and parameters 204 may be balanced and prioritized against each other through the use of penalties. For example, one of the rules and parameters 204 may require the scheduling module 201 to minimize the travel distance, or alternatively, the travel cost, for persons posted to the vacant posts 304, resulting in the scheduling module 201 generating postings that do not optimize, for example, the years of service, or the nationality mix, of persons posted to the vacant posts 304. As another example, one of the rules and parameters 204 may require that certain restaurants on cruise ships must have at least one waiter with 5 years of service, and no more than three waiters with less than 2 years of service, resulting in the scheduling module 201 generating postings that do not minimize travel distance to the extent that would have been possible without the rules and parameters 204.

For example, in an exemplary embodiment the scheduling module 201 may minimize travel costs for crew members assigned to cruise ships. The ART 101 may have access to airfares between home ports (where a crew member boards a cruise ship to being filling a post) and turnaround ports (where a crew member disembarks a cruise ship after the post has ended). Using these airfares, the ART 101 may produce postings that result in significant cost-savings on airfare for crew members when compared to manual scheduling.

Some of the rules and parameters 204 may be applied to the personnel roster 302 before the scheduling module 201 uses the linear optimization algorithm, in order to determine which persons on the personnel roster 302 are eligible for each of the vacant posts 304. This may reduce the number of variables the linear optimization algorithm needs to operate on. For example, only persons on the personnel roster 302 with the rank of bartender are eligible for a vacant post 304 requiring the rank of bartender. All other persons can be excluded from consideration for the vacant post 304 for a bartender. The linear optimization algorithm would therefore only need to consider the persons on the personnel roster 302 with the rank of bartender when attempting to generate a posting for the vacant post 304 for a bartender, rather than considering every person on the personnel roster 302, requiring fewer variables and less work.

A posting may not need to fill a vacant post 304 for the entire duration of the vacancy. For example, referring to FIG. 5, the vacant post 304 for Waiter 4 goes from September through November. The scheduling module 201 may generate a posting for Waiter 4 that only goes from September through October, if such a posting is permitted by the rules and parameters 204, and results in a more optimal schedule than would be possible if the vacant post 304 had to be filled for the duration of the vacancy. To this end, the rules and parameters 204 may include a rule allowing only one person to be posted to a vacant post 304 during any individual running of the ART 101, even if that person cannot be posted for the entire duration of the vacancy of the post.

Figures 15A, 15B:
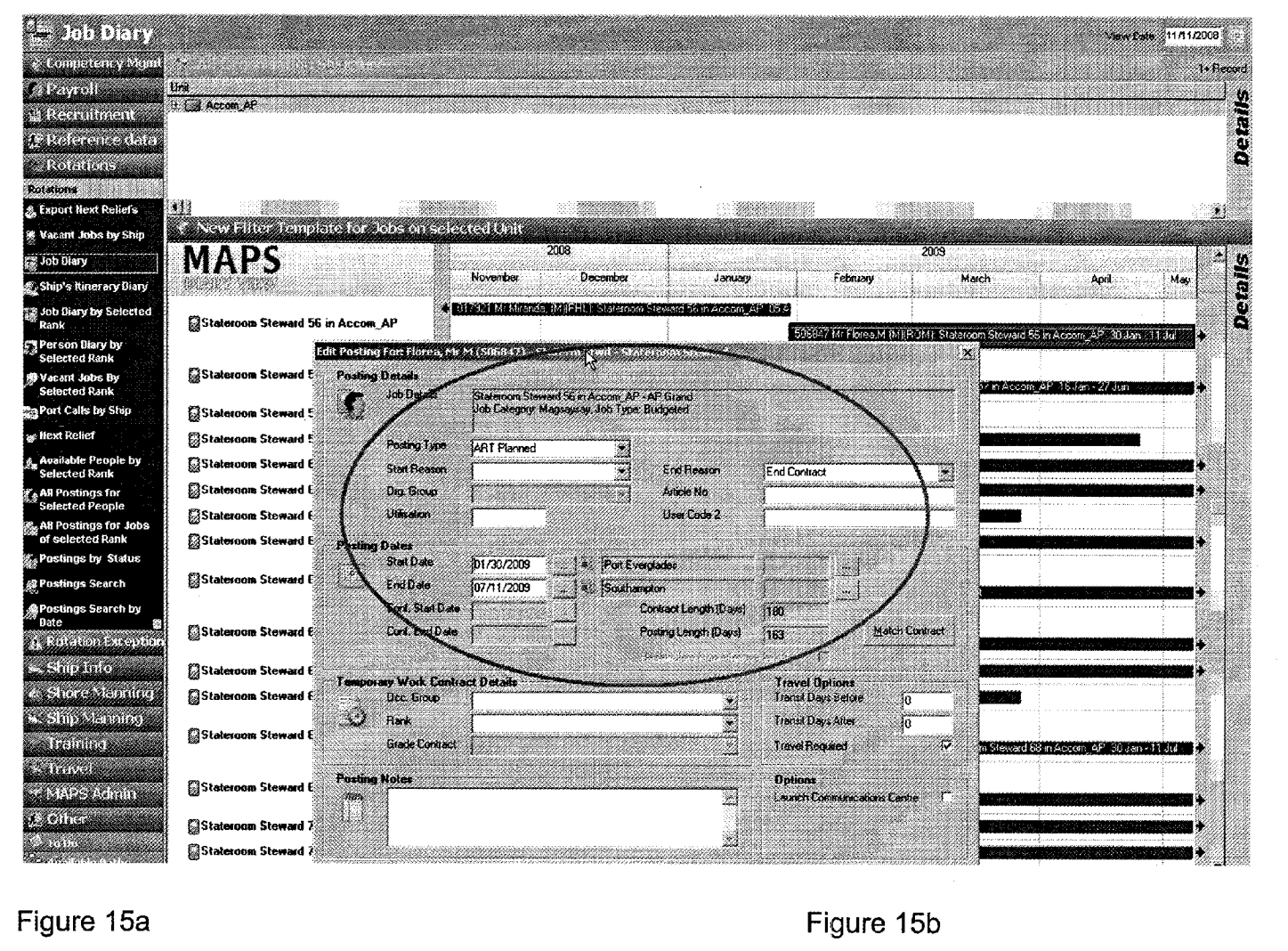

For example, after receiving the exemplary 60 day vacancy window, the vacant posts 304, and the personnel roster 302, the ART 101 may generate the exemplary postings depicted in FIG. 7 for Bar 1 on Cruise Ship A. Posting 1 posts Williams to the Waiter 1 post for October. Posting 2 posts Brown to the Waiter 2 post for September. Posting 3 posts Miller to the Waiter 4 post from September through November. Posting 4 posts Webb to the Bartender 2 post for September. FIGS. 15*a* and 15*b* depicts an exemplary screenshots of associated with a posting.

In block 406, the generated postings may be transmitted from the ART 101 to the scheduling database 102. The communications module 202 of the ART 101 may transmit the ART 101 generated postings to the communications module 303 of the scheduling database 102. The generated postings may be used by the scheduling database 102 to update the schedule 301, filling in the vacant posts 304 on the schedule 201 with the persons posted to those vacant posts 304 by the scheduling module 201. The personnel roster 302 may also be updated to reflect the generated postings, for example, changing the dates of availability of persons who have been posted to the previously vacant posts 304. The scheduling database 102 may also trigger peripheral actions related to the generated postings. For example, if a generated posting assigns a person living in Miami to a cruise ship that will be docked in Los Angeles at the start of the post, the scheduling database 102 may trigger an automated travel system that will automatically make the necessary travel arrangements for the person, such as booking flights and hotel rooms.

In block 407, the scheduling database 102 may determine if the generated postings require approval from a user 103. If approval of the generated postings is required, flow proceeds to block 408. Otherwise, flow proceeds to block 409.

In block 408, the user 103 may approve, disapprove, or modify the ART 101 generated postings. The scheduling database 102 may transmit the generated postings to an output device, such as, for example, a computer monitor, where the user 103 may examine them. If the user 103 approves of the generated postings, flow proceeds to block 409. If the user 103 disapproves the postings, flow proceeds to block 410 and ends. The user 103 may also make modifications to the generated postings, and then approve or disapprove of the postings.

In block 408, the scheduling database 102 may update the schedule 301 with the generated postings. The postings generated by the ART 101 may be used to update the schedule 301, filling in the vacant posts 304 of the schedule 301 with the persons from the personal roster 302 assigned to fill the vacant posts 304 according to the generated postings.

For example, the four exemplary postings depicted in FIG. 7 may be transmitted to the communications module 303 of the scheduling database 102. The scheduling database 102 may use the four exemplary postings to update the schedule 301 and the personnel roster 302, resulting in the exemplary updated schedule 801 depicted in FIG. 8, and the exemplary updated personnel roster 901, depicted in FIG. 9.

In block 410, the flow ends.

In an exemplary embodiment, the ART 101 may be used to post workers for an enterprise, including employees and independent contractors, to posts at any combination of stationary and non-stationary locations. For example, a cruise operator may use the ART 101 to fill posts that are only non-stationary, i.e., on cruise ships, or may use the ART 101 to fill posts that are both non-stationary and stationary, i.e. shore-based locations.

With reference to FIG. 1, the user 103 may communicate with the ART 101 using a variety of devices through a variety of communication media. Examples of devices that may be employed by the users 103 include, without limitation, computer systems, personal digital assistants, notebook computers, and/or telephones (of either wireline or wireless variety). Examples of communication media that can be employed include, without limitation, wireless data networks, wireline networks, and/or a variety of networked media.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments, such substitution is considered within the scope of the embodiments.

The examples presented herein are intended to illustrate potential and specific implementations of the present embodiments. It can be appreciated that the examples are intended primarily for purposes of illustration of the embodiments for those skilled in the art. The diagrams depicted herein are provided by way of example. There may be variations to these diagrams or the operations described herein without departing from the spirit of the present embodiments. For instance, in certain cases, method steps or operations may be performed or executed in differing order, or operations may be added, deleted or modified.

Furthermore, whereas particular embodiments have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A programmable computer system for scheduling comprising:
   (I) a programmable scheduling database comprising a computer system comprising a personnel roster and a schedule, wherein the schedule comprises a vacant post, the scheduling database adapted to:
      transmit the schedule and the personnel roster to a programmable automated rotation tool,
      receive a generated posting from the automated rotation tool, and
      update the schedule with the generated posting; and
   (II) the programmable automated rotation tool comprising at least one processor adapted to:
      receive a rule and a parameter,
      receive a vacancy window,
      receive the vacant post beginning within the vacancy window from the scheduling database,
      receive the personnel roster from the scheduling database,
      generate a posting assigning a person from the personnel roster to the vacant post according to the rule and the parameter, and
      transmit the posting to the scheduling database;
   (III) wherein the parameter is a member of the group comprising: minimization of travel time and minimization of travel costs.

2. The system of claim 1, wherein the posting is approved by a user before the schedule is updated with the generated postings.

3. The system of claim 1, wherein the automated rotation tool uses a linear optimization algorithm to generate the posting.

4. The system of claim 1, wherein the automated rotation tool uses at least one of the rule and the parameter to determine if the person from the personnel roster is eligible to be assigned to the vacant post.

5. The system of claim 1, wherein the rules and the parameter are balanced and prioritized against each other and against airfare cost using penalties assigned to each rule.

6. The system of claim 1, wherein penalties are assessed against the posting if the posting does not adhere to the rule and the parameter.

7. The system of claim 1, wherein penalties are stated in terms of monetized values, using a cost of a potential expenditure on airfare as a baseline for setting penalties.

8. The system of claim 1, wherein the scheduling database and the automated rotation tool comprise one computer system.

9. The system of claim 1, wherein the scheduling database is adapted to notify the person from the personal roster that the person has been assigned to the vacant post after receiving the posting.

10. The system of claim 1, wherein the scheduling database is adapted to make travel arrangements for the person in response to receiving the posting.

11. A programmable automated rotation tool apparatus comprising: a programmable apparatus to implement modules; an input module adapted to receive a rule, a parameter, and a vacancy window; a communications module adapted to receive a personnel roster and a vacant post, and transmit a posting; and a scheduling module adapted to generate a posting assigning a person from the personnel roster to the vacant post according to the rule and the parameter if the vacant post begins within the vacancy window; wherein the parameter is a member of the group comprising: minimization of travel time and minimization of travel costs.

12. The apparatus of claim 11, wherein the scheduling module is further adapted to determine if the vacant post begins within the vacancy window.

13. The apparatus of claim 11, wherein the communications module is further adapted to receive the vacant post only if the vacant post begins within the vacancy window.

14. The apparatus of claim 11, wherein the scheduling module uses a linear optimization algorithm.

15. The apparatus of claim 11, wherein the scheduling module is further adapted to determine if a person from the personnel roster is eligible to be assigned to the vacant post using at least one of the rule and the parameter.

16. A computer-implemented method for generating a posting comprising:

receiving by a computer system a rule, a parameter, and a vacancy window from a user;

receiving by the computer system a vacant post and a personnel roster, wherein the vacant post begins within the vacancy window; and generating with the computer system a posting assigning a person from the personnel roster to the vacant post according to the rule and the parameter; wherein the parameter is a member of the group comprising: minimization of travel time and minimization of travel costs.

17. The method of claim 16, wherein generating the posting uses a linear optimization algorithm.

18. The method of claim 16, further comprising, after generating a posting, transmitting the posting to a scheduling database.

19. The method of claim 18, further comprising receiving approval of the posting from a user before updating a schedule in the scheduling database with the generated postings.

20. The method of claim 16, further comprising:

before generating the posting, determining if a person from the personnel roster is eligible to be assigned to the vacant post using at least one of the rule and the parameter.

21. A programmable computer system for scheduling comprising:

(I) a programmable scheduling database comprising a computer system comprising a personnel roster and a schedule, wherein the schedule comprises a vacant post on a cruise ship, the scheduling database adapted to:

transmit the schedule and the personnel roster to a programmable automated rotation tool, receive a generated posting from the automated rotation tool, and update the schedule with the generated posting; and (II) the programmable automated rotation tool comprising at least one processor adapted to:

receive a rule and a parameter, receive a vacancy window, receive the vacant post on the cruise ship beginning within the vacancy window from the scheduling database, receive the personnel roster from the scheduling database, generate a posting assigning a crew member from the personnel roster to the vacant post on the cruise ship according to the rule and the parameter, and transmit the posting to the scheduling database;

wherein the parameter is a member of the group comprising: minimization of travel time and minimization of travel costs.

22. The system of claim 21, wherein the automated rotation tool uses at least one of the rule and the parameter to determine if the crew member from the personnel roster is eligible to be assigned to the vacant post.

23. The system of claim 21, wherein the scheduling database is adapted to notify the crew member from the personal roster that the person has been assigned to the vacant post after receiving the posting.

24. The system of claim 21, wherein the scheduling database is adapted to make travel arrangements for the crew member, in response to receiving the posting.

* * * * *